United States Patent
Benedict

(10) Patent No.: US 9,377,221 B2
(45) Date of Patent: Jun. 28, 2016

(54) VARIABLE HEAT PUMP USING MAGNETO CALORIC MATERIALS

(71) Applicant: General Electric Company, Schenectady, NY (US)

(72) Inventor: Michael Alexander Benedict, Louisville, KY (US)

(73) Assignee: General Electric Company, Schenectady, NY (US)

(*) Notice: Subject to any disclaimer, the term of this patent is extended or adjusted under 35 U.S.C. 154(b) by 341 days.

(21) Appl. No.: 13/949,395

(22) Filed: Jul. 24, 2013

(65) Prior Publication Data
US 2015/0027133 A1    Jan. 29, 2015

(51) Int. Cl.
*F25B 21/00* (2006.01)
*F25B 21/02* (2006.01)

(52) U.S. Cl.
CPC ........... *F25B 21/00* (2013.01); *F25B 2321/002* (2013.01); *F25B 2321/0022* (2013.01); *Y02B 30/66* (2013.01)

(58) Field of Classification Search
CPC ............... F25B 21/00; F25B 2321/002; F25B 2321/021–2321/0023; Y02B 30/66
USPC ..................................................... 62/3.1, 3.3
See application file for complete search history.

(56) References Cited

U.S. PATENT DOCUMENTS

| | | | |
|---|---|---|---|
| 668,560 A | 2/1901 | Fulner et al. | |
| 4,107,935 A | 8/1978 | Steyert, Jr. | |
| 4,507,927 A | 4/1985 | Barclay | |
| 4,549,155 A | 10/1985 | Halbach | |
| 4,625,519 A | 12/1986 | Hakuraku et al. | |
| 4,642,994 A | 2/1987 | Barclay et al. | |
| 5,091,361 A | 2/1992 | Hed | |
| 5,934,078 A * | 8/1999 | Lawton et al. | 62/3.1 |
| 6,446,441 B1 | 9/2002 | Dean | |
| 6,588,215 B1 | 7/2003 | Ghoshal | |
| 6,668,560 B2 | 12/2003 | Zimm et al. | |
| 6,935,121 B2 | 8/2005 | Fang et al. | |
| 7,552,592 B2 | 6/2009 | Iwasaki et al. | |

(Continued)

FOREIGN PATENT DOCUMENTS

CN    101979937    2/2011
EP    2108904 A1    10/2009

(Continued)

OTHER PUBLICATIONS

PCT Search Report and Written Opinion issued in connection with corresponding Application No. PCT/US2014/042485 on Oct. 31, 2014.

(Continued)

*Primary Examiner* — Judy Swann
*Assistant Examiner* — Joseph Trpisovsky
(74) *Attorney, Agent, or Firm* — Dority & Manning, P.A.

(57) ABSTRACT

A heat pump system is provided that uses multiple stages of MCMs with different Curie temperature ranges. An adjustable fluid flow path is used whereby the number of stages through which a heat transfer fluid passes can be varied depending upon e.g., the amount of heating or cooling desired. In certain embodiments, a magnetic field used to activate the MCMs can be manipulated so that the number of stages of MCMs that are activated also be adjusted. These and other features can improve the operating efficiency of the heat pump.

19 Claims, 8 Drawing Sheets

(56) References Cited

U.S. PATENT DOCUMENTS

| | | | |
|---|---|---|---|
| 7,897,898 | B2 | 3/2011 | Muller et al. |
| 8,209,988 | B2 | 7/2012 | Zhang et al. |
| 8,375,727 | B2 | 2/2013 | Sohn |
| 8,551,210 | B2 | 10/2013 | Reppel et al. |
| 8,695,354 | B2 | 4/2014 | Heitzler et al. |
| 2010/0071383 | A1 | 3/2010 | Zhang et al. |
| 2011/0162388 | A1 | 7/2011 | Barve et al. |
| 2011/0173993 | A1 | 7/2011 | Muller et al. |
| 2011/0182086 | A1 | 7/2011 | Mienko et al. |
| 2011/0192836 | A1 | 8/2011 | Muller et al. |
| 2011/0239662 | A1 | 10/2011 | Bahl et al. |
| 2011/0308258 | A1 | 12/2011 | Smith et al. |
| 2012/0079834 | A1 | 4/2012 | Dinesen |
| 2012/0222427 | A1 | 9/2012 | Hassen |
| 2012/0267090 | A1 | 10/2012 | Kruglick |
| 2012/0285179 | A1 | 11/2012 | Morimoto |
| 2013/0019610 | A1 | 1/2013 | Zimm et al. |
| 2013/0187077 | A1 | 7/2013 | Katter |
| 2014/0190182 | A1 | 7/2014 | Benedict |

FOREIGN PATENT DOCUMENTS

| | | |
|---|---|---|
| JP | 2002315243 A | 10/2002 |
| JP | 2007147136 | 6/2007 |
| JP | 20070147136 A | 6/2007 |
| JP | 2007/291437 A | 11/2007 |
| JP | 2008051412 | 3/2008 |
| WO | WO 02/12800 | 2/2002 |
| WO | 03016794 A1 | 2/2003 |
| WO | WO 03016794 | 2/2003 |
| WO | WO 2011/034594 A1 | 3/2011 |

OTHER PUBLICATIONS

International Search Report and Written Opinion issued in connection with PCT Application No. PCT/US2014/042485 dated Oct. 31, 2014.

International Search Report and Written Opinion issued in connection with PCT Application No. PCT/US2014/017431 dated May 16, 2014.

International search report issued in connection with PCT/US2013/070518, Jan. 30, 2014.

Tetsuji Okamura, Performance of a room-temperature rotary magnet refrigerator, Nov. 28, 2005, Elsevier.

PCT Invitation to Pay Additional Fees issued in connection with corresponding WO application No. PCT/US2014/042485 dated Sep. 5, 2014.

* cited by examiner

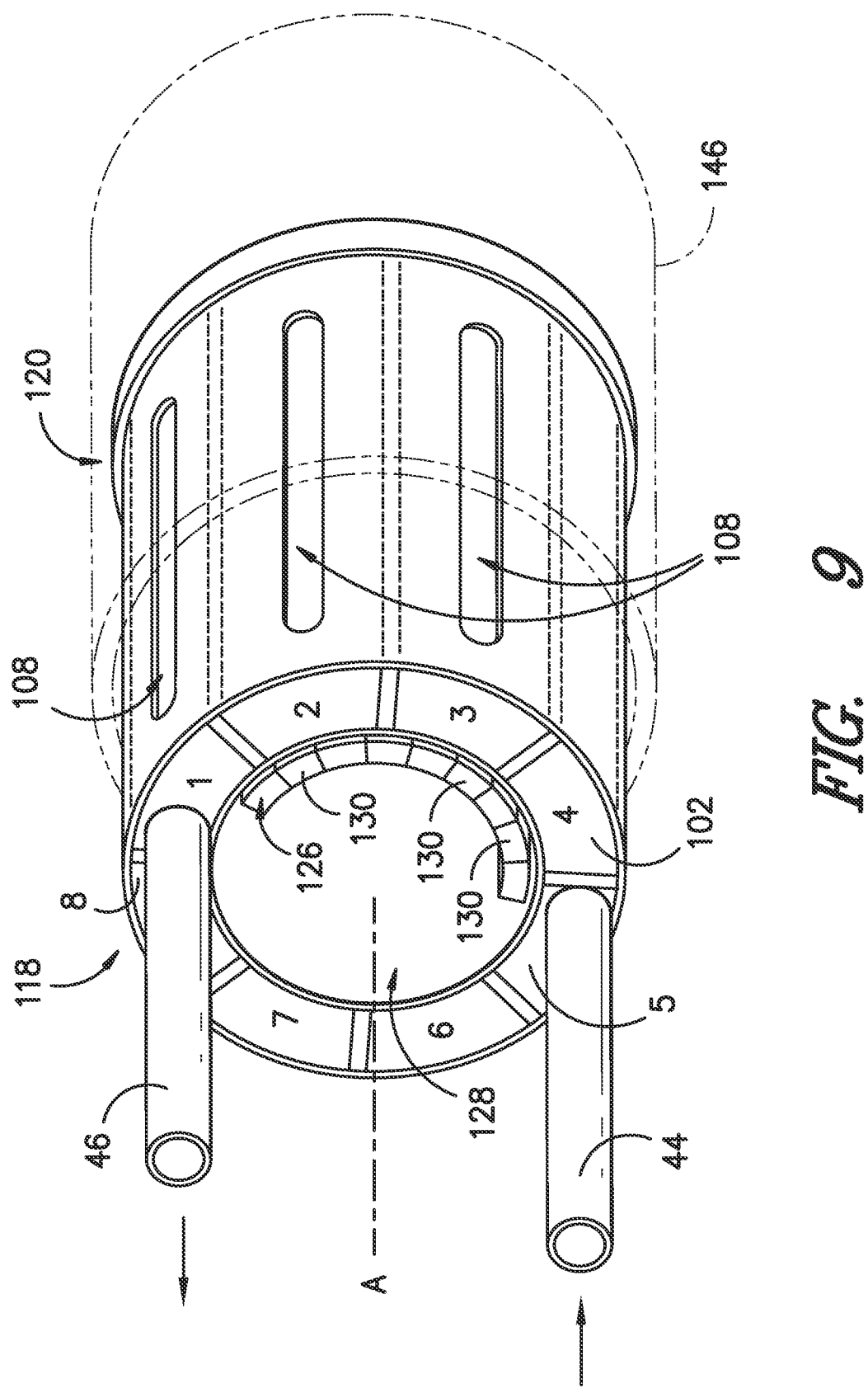

VARIABLE HEAT PUMP USING MAGNETO CALORIC MATERIALS

FIELD OF THE INVENTION

The subject matter of the present disclosure relates generally to a heat pump that can variably employ magneto caloric materials based on the amount of heat transfer needed.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning (heating or cooling) of residential or commercial structures. A variety of different fluid refrigerants have been developed that can be used with a heat pump in such systems.

Certain challenges exist with these conventional heat pump systems. While improvements have been made, at best heat pump systems that rely on the compression of fluid refrigerant can still only operate at about 45 percent or less of the maximum theoretical Carnot cycle efficiency. Also, some fluid refrigerants have been discontinued due to environmental concerns. The range of ambient temperatures over which certain such refrigerant-based systems can operate may be impractical for certain locations. Other challenges with heat pumps that use a fluid refrigerant exist as well.

Magneto caloric materials (MCM)—i.e. materials that exhibit the magneto caloric effect—provide a potential alternative to fluid refrigerants for heat pump applications. In general, the magnetic moments of a normal MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior—i.e. generating heat when a magnetic field is removed and becoming cooler when placed into the magnetic field. This latter type can be referred to as inverse or para-magneto caloric material. Both normal and inverse MCM are referred to collectively herein as magneto caloric material or MCM. The achievable percentage of theoretical Carnot cycle efficiency of a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, and equipment that can attractively utilize MCMs is still needed. For example, the ambient conditions under which a heat pump may be needed can vary substantially. For example, for a refrigerator appliance placed in a garage or located in a non-air conditioned space, ambient temperatures can range from below freezing to over 90° F. Some MCMs are capable of accepting and generating heat only within a much narrower temperature range than presented by such ambient conditions. Also, different MCMs may exhibit the magneto caloric effect more prominently at different temperatures.

As further described below, one approach for providing the cooling needed in e.g., refrigerator applications can be to use a heat pump with multiple different MCMs having different response temperatures but employed in a manner that provides the overall temperature change needed. However, as the contents of e.g., the refrigerator are lowered in temperature, utilizing all of these different MCMs can be inefficient. For example, where the heat pump utilizes a fluid that is passed through the MCMs for heat exchange, the pressure drop associated with passing the fluid through all MCMs represents an inefficiency when only a portion of the MCMs are needed at different stages of operation of the heat pump. By way of further example, subjecting all of the different MCMs to a magnetic field at all times while the heat pump is operating may also be unnecessary and, therefore, inefficient because of the energy used to apply the magnetic field.

Accordingly, a heat pump system that can address certain challenges such as those identified above would be useful. Such a heat pump system that can also be used in e.g., a refrigerator appliance would also be useful.

BRIEF DESCRIPTION OF THE INVENTION

The present invention provides a heat pump system that uses multiple stages of MCMs with different Curie temperature ranges. An adjustable fluid flow path is used whereby the number of stages through which a heat transfer fluid passes can be varied depending upon e.g., the amount of heating or cooling desired. In certain embodiments, a magnetic field used to activate the MCMs can be manipulated so that the number of stages of MCMs that are activated also be adjusted. These and other features can improve the operating efficiency of the heat pump. Additional aspects and advantages of the invention will be set forth in part in the following description, or may be apparent from the description, or may be learned through practice of the invention.

In one exemplary embodiment, the present invention provides a heat pump that includes a plurality of stages arranged sequentially along a predetermined direction. Each of the stages includes magneto caloric material having a Curie temperature range. The stages are arranged so that the Curie temperature ranges of the plurality of stages increase along the predetermined direction. An adjustable heat transfer fluid flow path through the heat pump is provided. The fluid flow path configured so that the number of stages through which heat transfer fluid passes is adjustable. A magnetic device is positioned adjacent to the plurality of stages. The magnetic device is configured to subject one or more of the plurality of stages to a magnetic field.

In another exemplary aspect, the present invention provides a method of operating a heat pump having a plurality of stages arranged sequentially along a predetermined direction. Each of the stages includes magneto caloric material having a Curie temperature range. The stages are arranged so that the Curie temperature ranges of the plurality of stages increase along the predetermined direction. The method includes the steps of directing a flow of fluid through the plurality of stages; adjusting the number of stages through which the fluid flows by altering a flow path of the fluid; and cycling the stages in and out of a magnetic field so as to exchange heat between the fluid and one or more of the stages. The step of adjusting changes the amount of heat exchanged between the stages and the fluid.

In still another exemplary embodiment, the present invention provides a heat pump system. The heat pump system includes a regenerator defining a circumferential direction and rotatable about an axial direction, the axial direction extending between a first end and a second end of the regenerator. The regenerator includes a plurality of chambers with each chamber extending longitudinally along the axial direction with an opening at the first end and having a first aperture positioned along a radially-outermost surface of each chamber. The plurality of chambers are arranged proximate to each other along the circumferential direction.

A plurality of working units are provided with each working unit positioned within one of the plurality of chambers and extending along the axial direction. Each working unit includes a plurality of stages arranged sequentially along the axial direction. Each stage includes magneto caloric material having a Curie temperature range. The plurality of stages arranged so that the Curie temperature ranges of the plurality of stages increase along the axial direction.

A valve is attached to the first end of the regenerator. The valve includes a plurality of apertures spaced apart from each other along the circumferential direction with each aperture positioned adjacent one of the openings of one of the plurality of chambers. A housing defines an interior into which the regenerator is rotatably received. The housing and regenerator are movable relative to each other along the axial direction. The housing defines a pair of second apertures positioned in an opposing manner. The pair of second apertures are configured for selective alignment with the first apertures of the plurality of chambers as the regenerator is rotated relative to the housing.

A magnetic device is positioned proximate to the regenerator and extends along the axial direction. The magnetic device is positioned so that one or more of the plurality of working units are moved in and out of the magnetic field as the regenerator is rotated about the axial direction. A seal is positioned adjacent to the valve and is configured such that the regenerator and the valve are rotatable relative to the seal. The seal includes a pair of ports positioned in an opposing manner relative to each other and also positioned so that each port can selectively align with at least one of the openings of the plurality of chambers as the regenerator is rotated about the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 is another perspective view of the exemplary heat pump of FIG. 6.

DETAILED DESCRIPTION OF THE INVENTION

Figure 1:
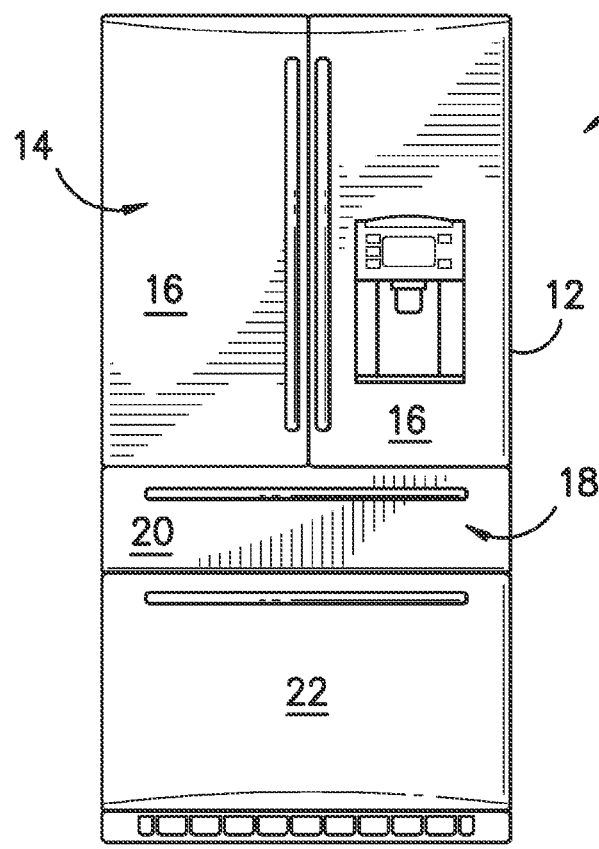
FIG. 1 provides an exemplary embodiment of a refrigerator appliance of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of an appliance refrigerator 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms.

Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present invention is not limited to appliances and may be used in other applications as well such as e.g., air-conditioning, electronics cooling devices, and others. Thus, it should be understood that while the use of a heat pump to provide cooling within a refrigerator is provided by way of example herein, the present invention may also be used in other applications to provide for heating and/or cooling as well.

Figure 2:
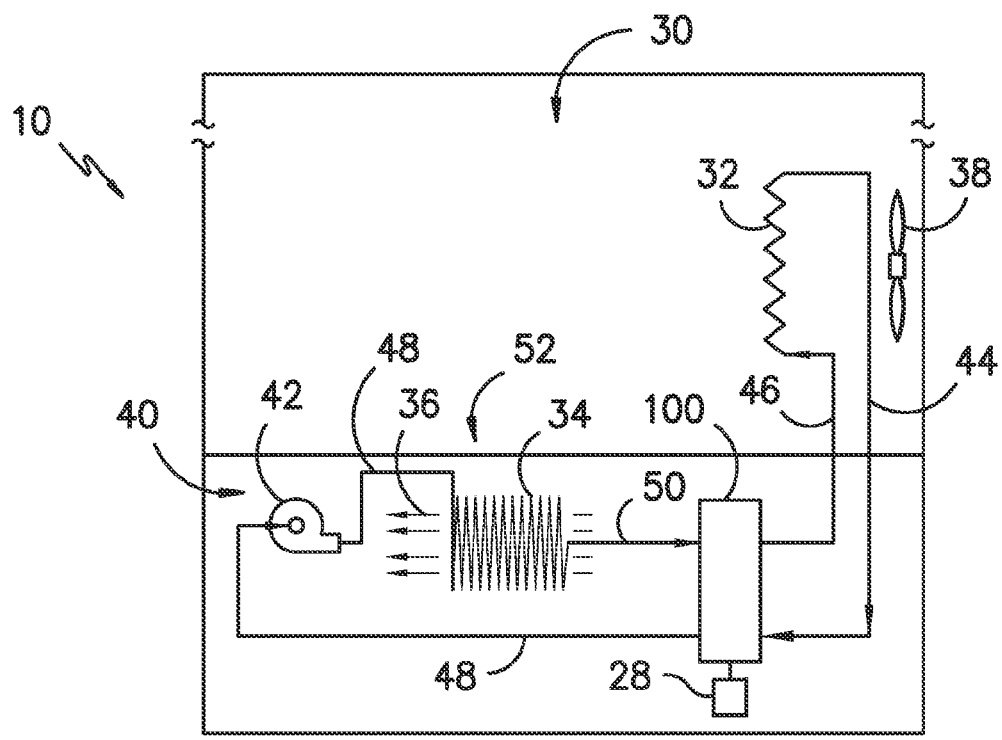
FIG. 2 is a schematic illustration of an exemplary heat pump system of the present invention positioned in an exemplary refrigerator with a machinery compartment and at least one refrigerated compartment.

FIG. 2 is a schematic view of another exemplary embodiment of a refrigerator appliance 10 including a refrigeration compartment 30 and a machinery compartment 40. In particular, machinery compartment 30 includes an exemplary heat pump system 52 of the present invention having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat associated with the magneto caloric effect provided by MCM in heat pump 100 and carries this heat by line 48 to pump 42 and then to second heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will be further described.

From second heat exchanger 34 the heat transfer fluid returns by line 50 to heat pump 100 where, as will be further described below, due to the magneto caloric effect, the heat transfer fluid loses heat to the MCM in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well.

Figure 3:
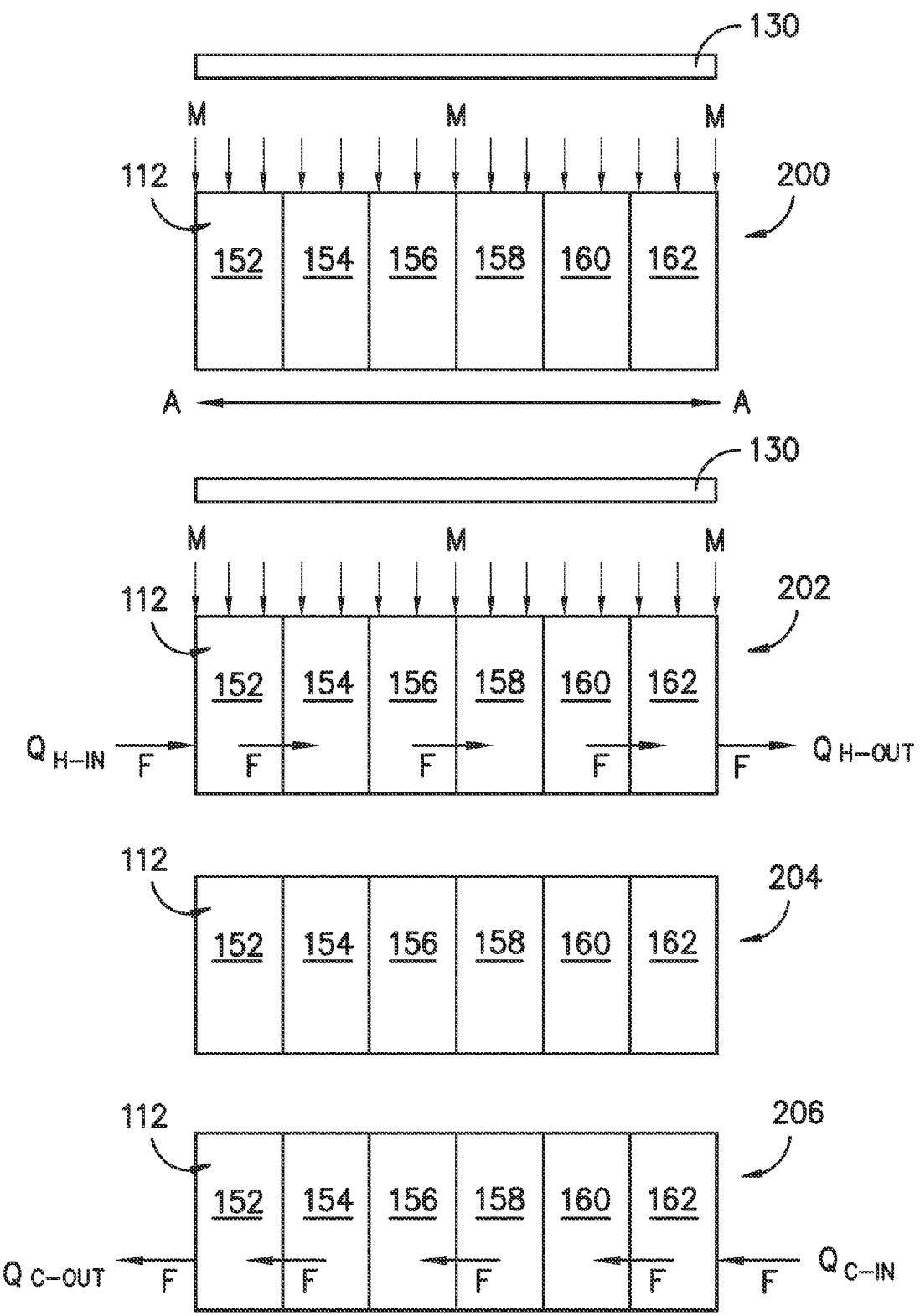
FIG. 3 is a schematic representation of various steps in the use of a plurality of stages (e.g., a working unit) of an exemplary embodiment of a heat pump.

FIG. 3 provides schematic representations of various steps in an exemplary method of use of a working unit 112 of an exemplary heat pump 100 of the present invention. Each working unit 112 is provided with a plurality of stages 152, 154, 156, 158, 160, and 162 of different MCMs that are arranged sequentially along a predetermined direction—e.g., along axial direction A-A in this exemplary embodiment. The arrangement of this plurality of stages along the predetermined direction is further discussed below.

During step 200, working unit 112 is fully within a magnetic field M created by magnet 130, which causes the magnetic moments of the material to orient and the MCM to heat (when a normal MCM is used) as part of the magneto caloric effect. During step 200, no heat transfer fluid is passed through working unit 112. In step 202, a heat transfer fluid is passed through each of the plurality of stages of working unit 112 along a heat transfer fluid flow path identified by arrows F. As denoted in FIG. 3, the heat transfer fluid exiting working unit 112 is heated by the MCMs in one or more of the stages 152 through 162 and exits with more heat energy (denoted with $Q_{H\text{-}OUT}$) from working unit 112 than when it entered (denoted by $Q_{H\text{-}IN}$).

In step 204, working unit 112 is cycled completely or substantially out of magnetic field M. The absence or lessening of the magnetic field is such that the magnetic moments of the MCM in one or more of the plurality of stages 152 through 162 become disordered and the MCM absorbs heat as part of the magneto caloric effect for a normal MCM. During step 204, there is no flow of heat transfer fluid through the plurality of stages. Referring now to step 206, heat transfer fluid is now allowed to flow through the plurality of stages 152 through 162 along the heat transfer fluid flow path indicated by arrows F. The heat transfer fluid exiting working unit 112 is cooled by the MCMs in one or more of the stages 152 through 162 and exits with less heat energy (denoted with $Q_{C\text{-}OUT}$) from working unit 112 than when it entered (denoted by $Q_{C\text{-}IN}$).

Working unit 112 includes MCMs having e.g., different temperature ranges over which each MCM exhibits the magneto caloric effect. By way of example, appliance 10 may be used in an application where the ambient temperature changes over a substantial range. However, a specific MCM may exhibit the magneto caloric effect over only a much narrower temperature range. As such, it may be desirable to use a variety of MCMs in the heat pump 100 to accommodate the wide range of ambient temperatures over which appliance 10 and/or heat pump 100 may be used.

Accordingly, as shown in FIG. 3, each working unit 112 is provided with a plurality of stages 152, 154, 156, 158, 160, and 162 of different MCMs that are arranged sequentially along a predetermined direction—e.g., along axial direction A-A in this exemplary embodiment. Each such stage includes an MCM that exhibits the magneto caloric effect at a different temperature or a different temperature range than an adjacent stage along the axial direction A-A. The range of temperature over which the MCM (normal or inverse) in each stage exhibits the desired magneto caloric response to provide heating or cooling is referred to herein as the "Curie temperature range."

The stages can be arranged so that e.g., the Curie temperature ranges of the plurality of stages increases along a predetermined direction such as axial direction A-A. For example, stage 152 may exhibit the magnet caloric effect at a temperature less than the temperature at which stage 154 exhibits the magnet caloric effect, which may be less than such temperature for stage 156, and so on. Other configurations may be used as well. By configuring the appropriate number and sequence of stages of MCMs, heat pump 100 can be operated over a substantial range of ambient temperatures.

In one exemplary embodiment, the Curie temperature ranges of stages 152, 154, 156, 158, 160, and 162 are also selected to overlap in order to facilitate heat transfer along direction HT. For example, in the embodiment shown in FIG. 3, stage 162 could have a Curie temperature range of 20° C. to 10° C.; stage 160 could have a Curie temperature range of 17.5° C. to 7.5° C.; stage 158 could have a Curie temperature range of 15° C. to 5° C.; stage 156 could have a Curie temperature range of 12.5° C. to 2.5° C.; stage 154 could have a Curie temperature range of 10° C. to 0° C.; and stage 152 could have a Curie temperature range of 5° C. to −2. These ranges are provided as examples; other Curie temperature ranges may be used as well in still other exemplary embodiments of the invention.

Figure 4:
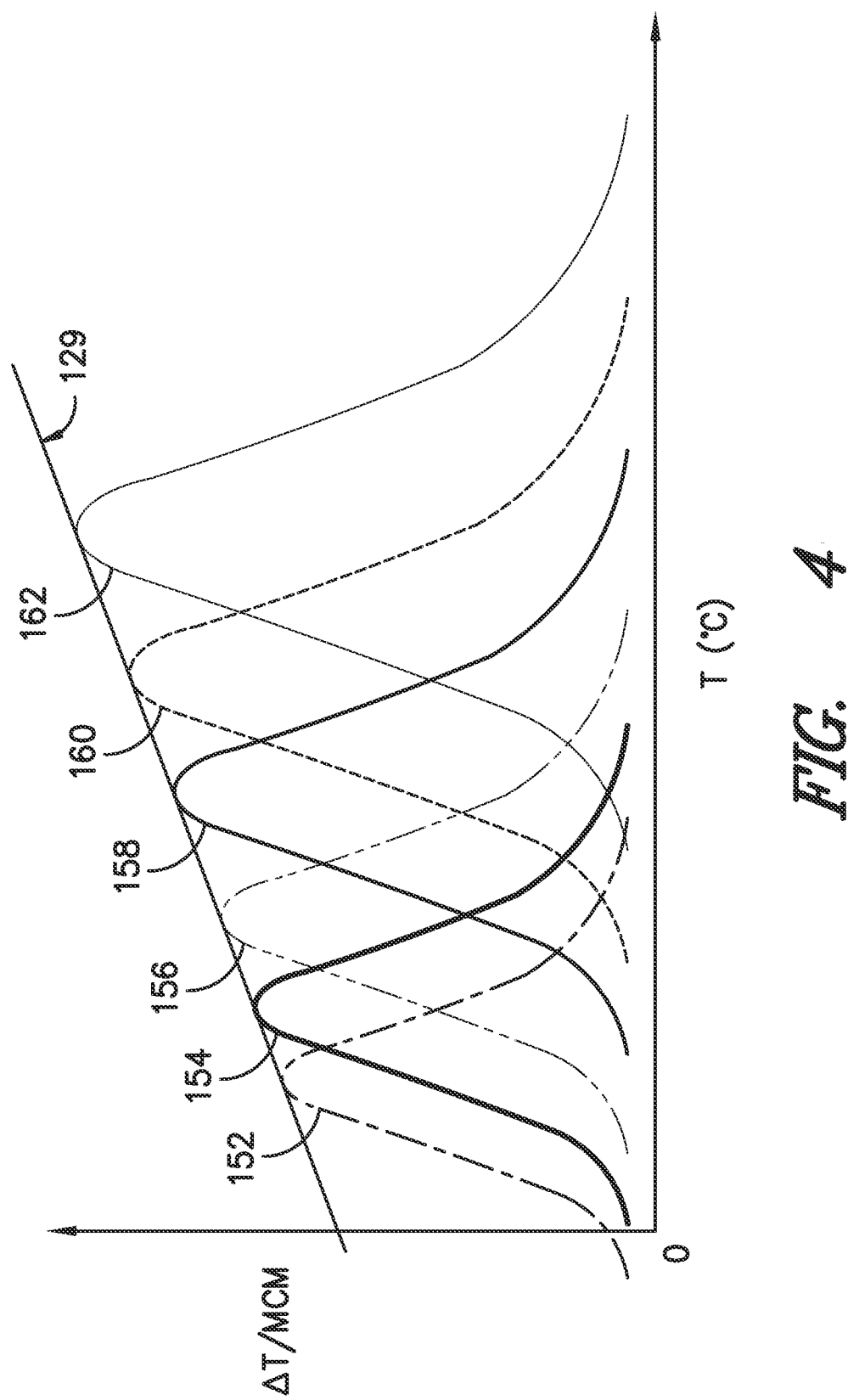
FIG. 4 is a plot of certain data regarding several stages of MCMs as further described below.

At stated, different types or e.g., alloys of MCMs can have different Curie temperature ranges over which the MCM will substantially exhibit a magneto caloric effect. In addition, the magnitude of the magneto caloric effect can also be different for different MCMs. For example, FIG. 4 provides a plot of the amount of temperature change per a unit of material of different MCMs ($\Delta T/MCM$) as a function of operating temperature T. As shown, for these particular MCMs, the amount of temperature change each stage of MCM can provide decreases as the temperature decreases. Also, the amount of the magneto caloric effect that can be obtained from a given stage is also dependent upon the strength—i.e., the amount of magnetic flux—of the magnetic field that is applied to the MCM. With a given MCM, for example, the magnitude of the magneto caloric effect will be less as the magnitude of the magnetic flux decreases.

During operation of a heat pump 100 having stages 152, 154, 156, 158, 160, and 162 as shown in FIG. 3, the stages having a higher Curie temperature range become less important as e.g., cooling takes place and the compartments of the refrigerator approach 0° C. As the temperature is lowered, the stages having lower Curie temperature ranges (e.g., stages 152 and 154) provide the cooling required to maintain the desired temperature. However, for the exemplary embodiment of FIG. 3, the heat transfer fluid flow path denoted by arrows F is through all stages and energy is expended in the form of a pressure drop as the heat transfer fluid is caused to flow through the MCM in each stage. Thus, depending upon the construction of the MCMs in each stage, such heat transfer fluid flow path (arrows F) can be inefficient because e.g., of the pressure drop associated with pumping the heat transfer fluid through all stages 152 through 162 rather than only the stages that are providing the desired heat transfer. In addition, additional inefficiency comes from the power loss associated with cycling all of the stages 152 through 162, including the higher Curie temperature range (e.g., 160 and 162), through magnetic field M rather than only those stages providing the desired heat transfer.

Figure 5:
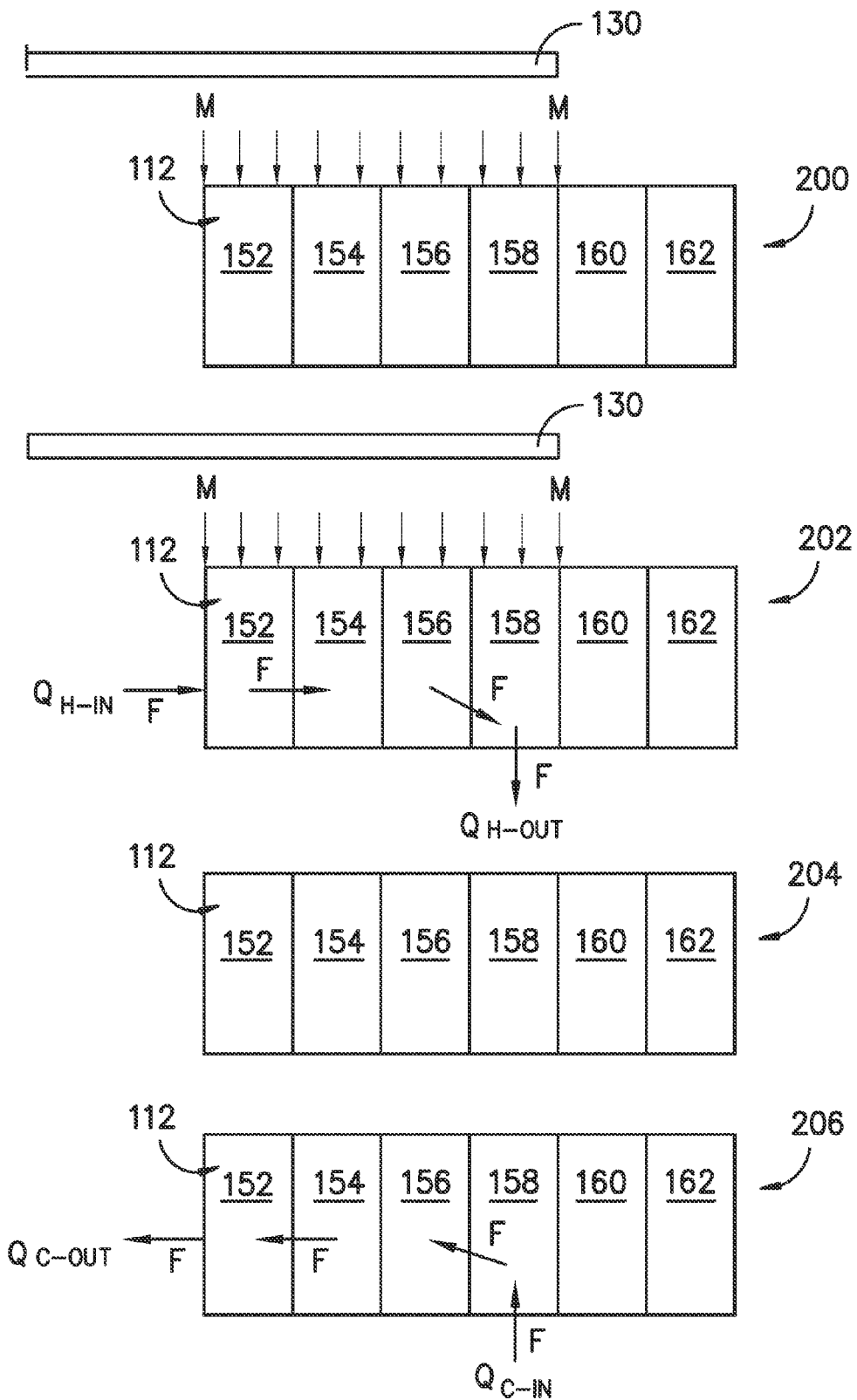
FIG. 5 is a schematic representation of various steps in the use of a plurality of stages (e.g., a working unit) of another exemplary embodiment of a heat pump.

Accordingly, heat pump 100 is provided with an adjustable fluid flow path that is configured so that the number of stages through which the heat transfer fluid passes is adjustable based e.g., which stages are needed at any particular time during use of heat pump 100. FIG. 5 sets forth the same exemplary method in steps 200, 202, 204, and 206 as found in FIG. 3. However, in the exemplary method of FIG. 5, fluid flow path F is adjusted so that the heat transfer fluid flows through less than all of the plurality of stages 152 through 162. In this example, during step 202, the heat transfer fluid flows along the adjusted fluid flow path shown by arrows F to remove heat from the working unit 112 of heat pump 100. As indicated, this adjustable fluid flow path includes only stages 152, 154, 156, and 158. Similarly, during step 206, the heat transfer fluid flows along the adjusted fluid flow path shown by arrows F to remove heat from the heat transfer fluid and transfer such heat to stages 152, 154, 156, and 158.

Stages 152, 154, 156, and 158 might be selected from the plurality of stages depending upon e.g., the overall temperature change desired for the heat transfer fluid, ambient temperature conditions, the properties of the MCM used in each stage, and/or the temperature of the heat transfer fluid entering and leaving working unit 112 at various stages during the use of heat pump 100. Stages 152, 154, 156, and 158 are used by way of example only. By way of further example, the fluid flow path might include only one of the stages 152 through 162, any consecutive subset of such stages, or all. The number of stages may be continuously adjusted during operation of heat pump 100 as the stages are cycled in an out of magnetic field M.

Also, as shown in FIG. 5, the magnetic field M can be adjusted so as to change the number of stages subjected to such field. For example, in steps 200 and 202, magnet 130 has been shifted to as to cycle stages 152, 154, 156, and 158 to magnetic field M while reducing or eliminating the magnetic field M for stages 160 and 162.

Figure 8:
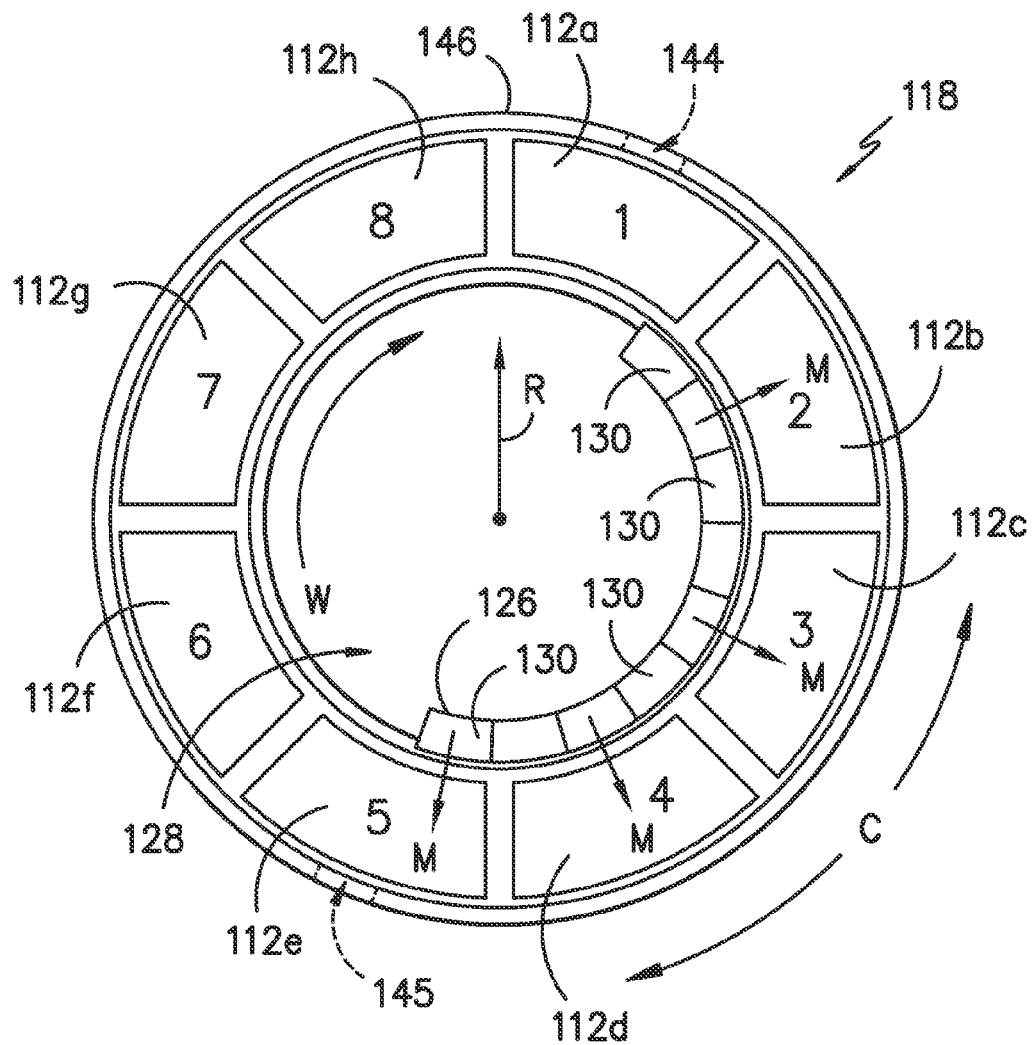
FIG. 8 is a cross-sectional view of the exemplary heat pump of FIG. 6.

FIGS. 6, 7, 8, and 9 depict various views of another exemplary heat pump 100 of the present invention. Heat pump 100 includes a regenerator 102 that extends longitudinally along an axial direction A-A between a first end 118 and a second end 120. The axial direction is defined by axis A-A about which regenerator 102 rotates. A radial direction R is defined by a radius extending orthogonally from the axis of rotation A-A (FIG. 8). A circumferential direction is indicated by arrows C.

Figure 6:
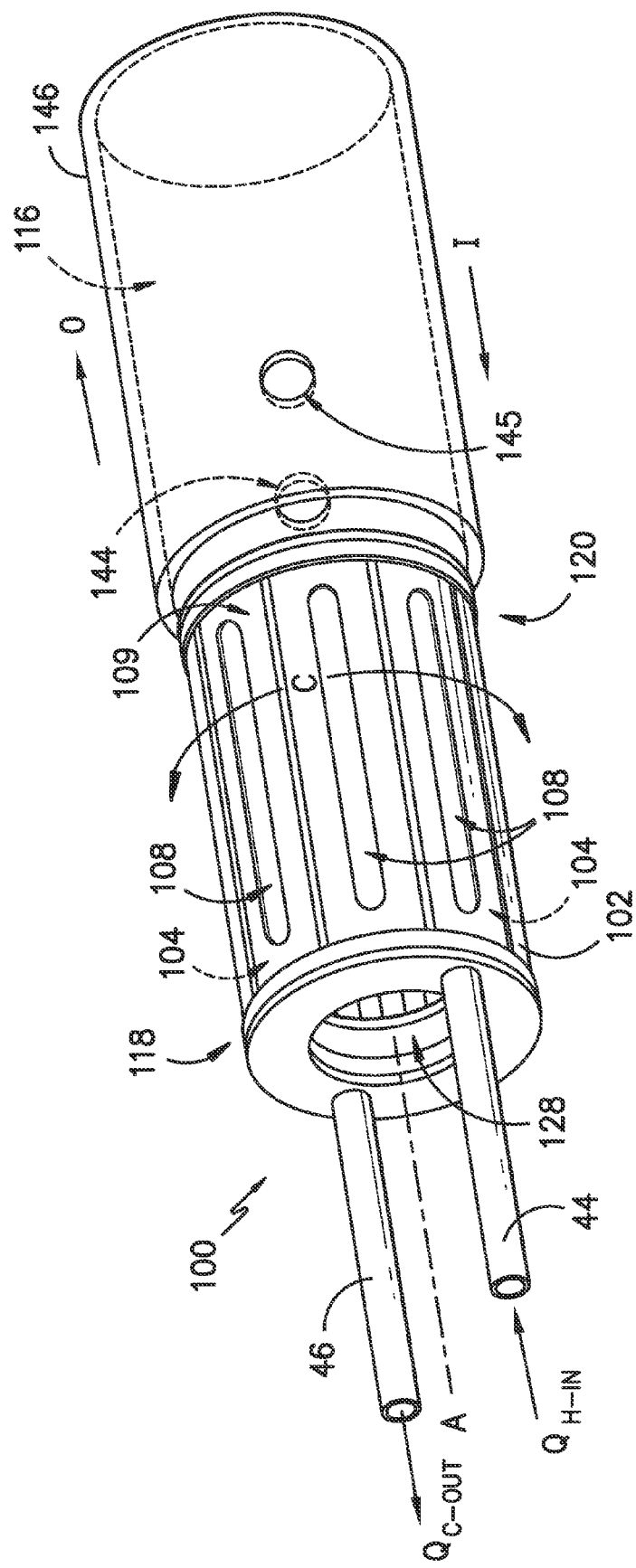
FIG. 6 is a perspective view of an exemplary embodiment of a heat pump of the present invention.
Figure 7:
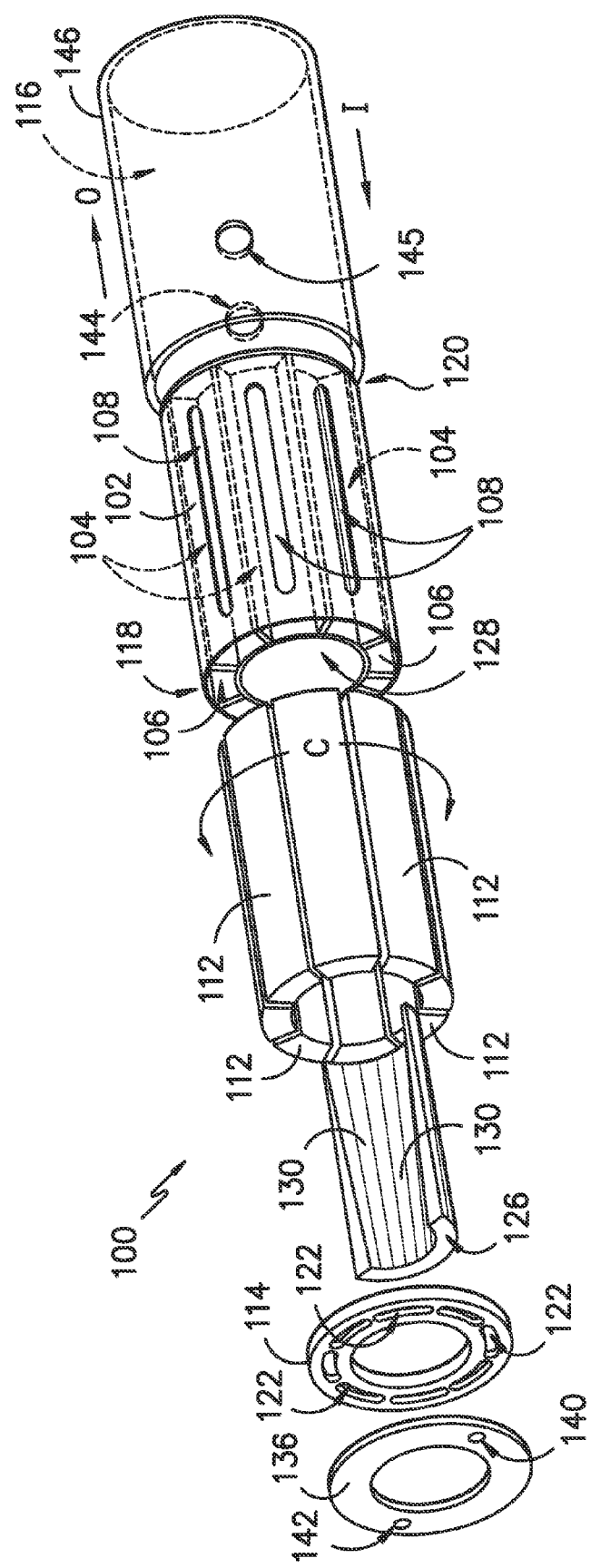
FIG. 7 is an exploded view of the exemplary embodiment of a heat pump shown in FIG. 6.

Regenerator 102 defines a plurality of chambers 104 that extend longitudinally along the axial direction defined by axis A-A. Chambers 104 are positioned proximate or adjacent to each other along circumferential direction C. Each chamber 104 includes an opening 106 at first end 118 of regenerator 102. A first aperture 108 extends along the predetermined direction or axial direction A-A of each chamber 104 along it radially outermost surface 109 (FIG. 6). For this exemplary embodiment, first aperture 108 is configured as a slot.

Heat pump 100 also includes a plurality of working units 112 that each includes a plurality of stages of MCMs arranged sequentially along the axial direction A-A in a manner similar to the exemplary embodiment of FIG. 3. Each working unit 112 is located in one of the chambers 104 and extends along axial direction A-A. For the exemplary embodiment shown in the figures, heat pump 100 includes eight working units 112 positioned adjacent to each other along the circumferential direction C as shown and extending longitudinally along the axial direction A-A. As will be understood by one of skill in the art using the teachings disclosed herein, a different number of working units 112 other than eight may be used as well.

A valve 114 is attached to regenerator 102 and rotates therewith along circumferential direction C. More particularly, valve 114 is attached to first end 118 and includes a plurality of apertures 122 that, for this exemplary embodiment, are configured as circumferentially-extending slots 122 that are spaced apart along circumferential direction C.

Each aperture 122 is positioned adjacent to a respective opening 106 of a chamber 104. Accordingly, a heat transfer fluid may follow a fluid flow path whereby the fluid flows into a chamber 104 through a respective aperture 122 and opening 106 so as to flow through one or more stages of MCM in working unit 112. Continuing along the fluid flow path, fluid can then exit through a respective first aperture 108 when it is aligned with one of the second apertures 144 or 145 defined by housing 146. The pair of second apertures 144 and 145 are positioned in an opposing manner on housing 146 as shown.

Regenerator 102 is received into an interior 116 defined by housing 146. Regenerator 102 is rotatable within housing 146. Additionally, housing 146 and regenerator 102 are movable along the axial direction A-A. As regenerator 102 is caused to rotate relative to housing 146 by operation of e.g., motor 28 (FIG. 2), second apertures 144 and 145 can align with a pair of first apertures 108. As rotation continues, a different pair of first apertures 108 will align with second apertures 144 and 145, and so on.

The position of the pair of second apertures 144 and 145 relative to a pair of first apertures 108 along axial direction A-A can be selectively determined so as to adjust the heat transfer fluid flow path and thereby control the number of stages of MCMs in each working unit 112 through which the heat transfer fluid passes. More specifically, by adjusting the alignment of second apertures 144 and 145 with first apertures 108, the number of stages through with the heat transfer fluid travels along the fluid flow path can be modified. For example, by sliding housing 146 along the direction of arrow I, the fluid flow path can be adjusted so that a fewer number of stages of MCMs in each working unit 112 can be selected for heat transfer as such are cycled in and out of magnetic field M. Moving housing 146 in the direction of arrow I along axial direction A shortens the distance between openings 106 and second apertures 144 and 145—thereby shortening the fluid flow path. Conversely, by sliding housing along direction of arrow O, a greater number of stages of MCMs in each working unit 112 can be selected for heat transfer. Moving housing 146 along the direction of arrow O lengthens the distance between openings 106 and second apertures 144 and 145— thereby lengthening the fluid flow path. A reverse fluid flow path can be used for flow of the heat transfer fluid in the opposite direction through the working unit 112 of a given chamber 104 as will be further described.

Regenerator 102 defines a cavity 128 that is positioned radially inward of the plurality of chambers 104 and extends along the axial direction A-A between first end 118 and second end 120. A magnetic device 126 is positioned within cavity 128 and, for this exemplary embodiment, extends along the axial direction A-A between first end 118 and second end 120. Magnetic device 126 provides a magnetic field M that is directed radially outward as indicated by arrows M in FIG. 8.

The positioning and configuration of magnetic device 126 is such that only a subset (e.g., one, two, or more) of the plurality of working units 112 is/are within or subjected to magnetic field M at any one time as regenerator 102 is rotated within housing 146. For example, as shown in FIG. 8, working units 112*a* and 112*e* are partially within the magnetic field while units 112*b*, 112*c*, and 112*d* are fully within the magnetic field M created by magnetic device 126. Conversely, the magnetic device 126 is configured and positioned so that working units 112*f*, 112*g*, and 112*h* are completely or substantially out of the magnetic field created by magnetic device 126. However, as regenerator 102 is continuously rotated along circumferential direction C as shown by arrow W, the subset of working units 112 within the magnetic field will continuously change as some working units 112 will enter magnetic field M and others will exit.

Returning to FIG. 7, Seal 136 is provided and positioned at first end 118 of regenerator 102. Seal 136 has an inlet port 140 and an outlet port 142 and is positioned adjacent to valve 114. As shown, ports 140 and 142 are positioned 180 degrees apart about the circumferential direction C of first seal 114. However, other configurations may be used. For example, ports 140 and 142 may be positioned within a range of about 170 degrees to about 190 degrees about the circumferential direction C as well. Valve 114 and regenerator 102 are rotatable relative to seal 136. Ports 140 and 142 are connected with lines 44 and 46 (FIG. 1), respectively. As such, the rotation of regenerator 102 about axis A-A sequentially places lines 44 and 46 in fluid communication with at least two working units 112 of MCM at any one time as will be further described.

Second apertures 144 and 145 are in fluid communication with lines 50 and 48 (FIG. 1), respectively. As such, the rotation of regenerator 102 about axis A-A sequentially places lines 48 and 50 in fluid communication with at least two working units 112 of MCM at any one time as will be further described. Notably, at any one time during rotation of regenerator 102, lines 46 and 50 will each be in fluid communication with at least one working unit 112 while lines 44 and 48 will also be in fluid communication with at least one other working unit 112 located about 180 degrees away along the circumferential direction.

Returning to FIG. 3, an exemplary method of using the heat pump 100 of FIGS. 6, 7, 8, and 9 is now described. FIG. 3 depicts schematic representation of a working unit 112 of MCM in regenerator 102 as it rotates in the direction of arrow W between positions 1 through 8 as shown in FIG. 9. During step 200, working unit 112 is fully within magnetic field M, which causes the magnetic moments of the material to orient and the MCM to heat (when a normal MCM is used) as part of the magneto caloric effect. Ordering of the magnetic field is created and maintained as working unit 112 is rotated sequentially through positions 2, 3, and then 4 (FIG. 9) as regenerator 102 is rotated in the direction of arrow W. During the time at positions 2, 3, and 4, the heat transfer fluid dwells in the MCM of working unit 112 and, therefore, is heated. More specifically, the heat transfer fluid does not flow through working unit 112 because the openings 106, 108, 122, and 124 corresponding to working unit 112 in positions 2, 3, and 4 are not aligned with any of the ports 140, 142, 144, or 146.

In step 202, as regenerator 102 continues to rotate in the direction of arrow W, working unit 112 will eventually reach position 5. As shown in FIGS. 6, 8, and 9, at position 5 the heat transfer fluid can flow along a fluid flow path (arrows F) through one or more stages of the MCMs in working unit 112 (the number of stages will depend upon the position of housing 146 along axial direction A-A) as inlet port 140 is now aligned with an opening 122 in valve 114 and an opening 106 at the first end 118 of working unit 112—while second aperture 145 is aligned with a first aperture 108 of the same working unit 112.

As indicated by arrow $Q_{H\text{-}OUT}$ in FIG. 3, heat transfer fluid in working unit 112, now heated by the MCM, can travel out of regenerator 102 from second aperture 145 and along line 48 to the second heat exchanger 34. At the same time, and as indicated by arrow $Q_{H\text{-}IN}$, heat transfer fluid from first heat exchanger 32 flows into working unit 112 from line 44 when working unit 112 is at position 5. Because heat transfer fluid from the first heat exchanger 32 is relatively cooler than the MCM in working unit 112, the MCM will lose heat to the heat transfer fluid.

Referring again to FIG. 3 and step 204, as regenerator 102 continues to rotate in the direction of arrow W, working unit 112 is moved sequentially through positions 6, 7, and 8 where working unit 112 is completely or substantially out of magnetic field M. The absence or lessening of the magnetic field is such that the magnetic moments of the MCM become disordered and the MCM absorbs heat as part of the magneto caloric effect for a normal MCM. During the time in positions 6, 7, and 8, the heat transfer fluid dwells in the MCM of working unit 112 and, therefore, is cooled by losing heat to the MCM as the magnetic moments disorder. More specifically, the heat transfer fluid does not flow through working unit 112 because the openings 106, 108, 122, and 124 corresponding to working unit 112 when in positions 6, 7, and 8 are not aligned with any of the ports 140, 142, 144, or 146.

Referring to step 206 of FIG. 3, as regenerator 102 continues to rotate in the direction of arrow W, working unit 112 will eventually reach position 1. As shown in FIGS. 6, 8, and 9, at position 1 the heat transfer fluid in working unit 112 can flow through the MCM as second aperture 144 is now aligned with a first aperture 108 while outlet port 142 is aligned with an opening 122 in first valve 114 and opening 106 at first end 118. As indicated by arrow $Q_{C\text{-}OUT}$ in FIGS. 3 and 6, heat transfer fluid in working unit 112, now cooled by the MCM, can travel out of regenerator 102 and along line 46 to the first heat exchanger 32. At the same time, and as indicated by arrow $Q_{C\text{-}IN}$, heat transfer fluid from second heat exchanger 34 flows through second aperture 144 and into working unit 112 from line 50 when working unit 112 is at position 1. Because heat transfer fluid from the second heat exchanger 34 is relatively warmer than the MCM in working unit 112 at position 1, the MCM will lose some of its heat to the heat transfer fluid. The heat transfer fluid now travels along line 46 to the first heat exchanger 32 to receive heat and cool the refrigeration compartment 30.

As regenerator 102 is rotated continuously, the above described process of cycling or placing each working unit 112 in and out of magnetic field M is repeated. Additionally, the size of magnetic field M and regenerator 102 are such that a subset of the plurality of working units 112 is within the magnetic field at any given time during rotation. Similarly, a subset of the plurality of working units 112 are outside (or substantially outside) of the magnetic field at any given time during rotation. At any given time, there are at least two working units 112 through which the heat transfer fluid is flowing while the other working units 112 remain in a dwell mode. More specifically, while one working unit 112 is losing heat through the flow of heat transfer fluid at position 5, another working unit 112 is receiving heat from the flowing heat transfer fluid at position 1, while all remaining working units 112 are in dwell mode. As such, the system can be operated continuously to provide a continuous recirculation of heat transfer fluid in heat pump system 52 as working units 112 are each sequentially rotated through positions 1 through 8.

As will be understood by one of skill in the art using the teachings disclosed herein, the number of working units for housing 102, the number of ports in valve 114, and/or other parameters can be varied to provide different configurations of heat pump 100 while still providing for continuous operation. For example, valve 114 could be provided within two inlet ports and two outlet ports so that heat transfer fluid flows through at least four working units 112 at any particular point in time. Alternatively, regenerator 102, valve 114, and/or seal 136 could be constructed so that e.g., at least two working units are in fluid communication with an inlet port and outlet port at any one time. Other configurations may be used as well.

Although a magnet 130 is shown in some of the figures for creating magnetic field M, other magnetic devices may also be used including e.g., an electromagnet. Also, first apertures 108 are shown as slots while second apertures 144 and 145 are shown as holes. It will be understood that the first apertures, the second apertures, and/or combinations thereof could be configured as holes or slots.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump, comprising:
   a plurality of stages arranged sequentially along an axial direction, each of the stages comprising magneto caloric material having a Curie temperature range, the stages arranged so that the Curie temperature ranges of the plurality of stages increase along the axial direction;
   an adjustable heat transfer fluid flow path through the heat pump, the fluid flow path configured so that the number of stages through which heat transfer fluid passes is adjustable;
   a magnetic device positioned adjacent to the plurality of stages, the magnetic device configured to subject one or more of the plurality of stages to a magnetic field;
   a regenerator extending along the axial direction, the regenerator and magnetic device rotatable relative each other about the axial direction so as to cycle the stages through the magnetic field, the regenerator including the plurality of stages, the regenerator defining a first aperture along the fluid flow path, the first aperture configured as a slot extending along the axial direction; and
   a housing containing the plurality of stages and the regenerator, the housing defining a second aperture smaller than the first aperture and alignable with the first aperture;
   wherein the regenerator and housing are movable relative to each other along the axial direction so as to adjust the alignment between the first aperture and second aperture and modify the number of stages through which the heat transfer fluid passes.

2. The heat pump of claim 1, wherein the magnetic device is configured such that the number of stages subjected to the magnetic field is adjustable.

3. The heat pump of claim 2, wherein the magnetic device is movable along the axial direction such that the number of stages subjected to the magnetic field is adjustable.

4. The heat pump of claim 1, wherein the stages are arranged immediately adjacent to each other along the axial direction.

5. The heat pump of claim 4, wherein the first aperture, second aperture, or both are configured as a slot that extends longitudinally along the axial direction.

6. The heat pump of claim 1, wherein the Curie temperature ranges of the plurality of stages overlap between stages that are adjacent along the axial direction.

7. The heat pump of claim 1, wherein the magnetic device, the plurality of stages, or both, are configured for cycling the plurality of stages in and out of the magnetic field during operation of the heat pump.

8. The heat pump of claim 1, wherein the magnetic device comprises an electromagnet.

9. A refrigerator appliance comprising the heat pump of claim 1.

10. A method of operating a heat pump having a regenerator extending along an axial direction, the regenerator defining a plurality of stages arranged sequentially along an axial direction, wherein each of the stages comprise magneto caloric material having a Curie temperature range, the stages arranged so that the Curie temperature ranges of the plurality of stages increase along the axial predetermined direction, a housing defining a chamber into which the regenerator is rotatably received, the method comprising the steps of:
   directing a flow of fluid through the plurality of stages;
   adjusting the number of stages through which the fluid flows by altering a flow path of the fluid, wherein the adjusting comprises moving a first aperture of the housing parallel to the axial direction to communicate with a second aperture of the regenerator so as to decrease or increase the flow path; and
   rotating the stages about an axial direction so at to cycle the stages in and out of a magnetic field and exchange heat between the fluid and the one or more of the stages;
   wherein the step of adjusting changes the amount of heat exchanged between the stages and the fluid.

11. The method of operating a heat pump in claim 10, wherein said adjusting step comprises increasing the number of stages through which heat transfer fluid flows.

12. The method of operating a heat pump in claim 10, wherein said adjusting step comprises decreasing the number of stages through which heat transfer fluid flows.

13. The method of operating a heat pump in claim 10, further comprising the step of changing the number of stages subjected to the magnetic field.

14. A heat pump system, comprising:
   a regenerator defining a circumferential direction and rotatable about an axial direction, the axial direction extending between a first end and a second end of the regenerator, the regenerator comprising a plurality of chambers with each chamber extending longitudinally along the axial direction with an opening at the first end and having a first aperture positioned along a radially-outermost surface of each chamber, the plurality of chambers arranged proximate to each other along the circumferential direction;
   a plurality of working units, each working unit positioned within one of the plurality of chambers and extending along the axial direction, each working unit comprising a plurality of stages arranged sequentially along the axial direction, each stage comprising magneto caloric material having a Curie temperature range, the plurality of stages arranged so that the Curie temperature ranges of the plurality of stages increase along the axial direction;

a valve attached to the first end of the regenerator, the valve comprising a plurality of apertures spaced apart from each other along the circumferential direction with each aperture positioned adjacent one of the openings of one of the plurality of chambers;

a housing defining a chamber into which the regenerator is rotatably received, the housing and regenerator movable relative to each other along the axial direction, the housing defining a pair of second apertures positioned in an opposing manner, the pair of second apertures configured for selective alignment with the first apertures of the plurality of chambers as the regenerator is rotated relative to the housing;

a magnetic device positioned proximate to the regenerator and extending along the axial direction, the magnetic device positioned so that one or more of the plurality of working units are moved in and out of the magnetic field as the regenerator is rotated about the axial direction; and a seal positioned adjacent to the valve and configured such that the regenerator and the valve are rotatable relative to the seal, the seal comprising a pair of ports positioned in an opposing manner relative to each other and also positioned so that each port can selectively align with at least one of the openings of the plurality of chambers as the regenerator is rotated about the axial direction.

15. The heat pump system of claim 14, wherein the regenerator defines a radial direction and further comprises a cavity positioned radially-inward of the plurality of chambers, wherein the magnetic device is positioned within the cavity of the regenerator.

16. The heat pump system of claim 14, wherein the magnetic device comprises a plurality of magnets arranged in the shape of an arc and configured to project a magnetic field substantially along a radially-outward direction.

17. The heat pump system of claim 14, wherein the Curie temperature ranges of the plurality of stages overlap between stages that are adjacent along the axial direction.

18. The heat pump system of claim 14, wherein the magnetic device comprises an electromagnet.

19. A refrigerator appliance comprising the heat pump system of claim 14.

* * * * *